No. 704,076. Patented July 8, 1902.
W. C. McBRIDE.
VENTILATOR AND MIRROR PROTECTOR.
(Application filed Sept. 28, 1901.)
(No Model.)
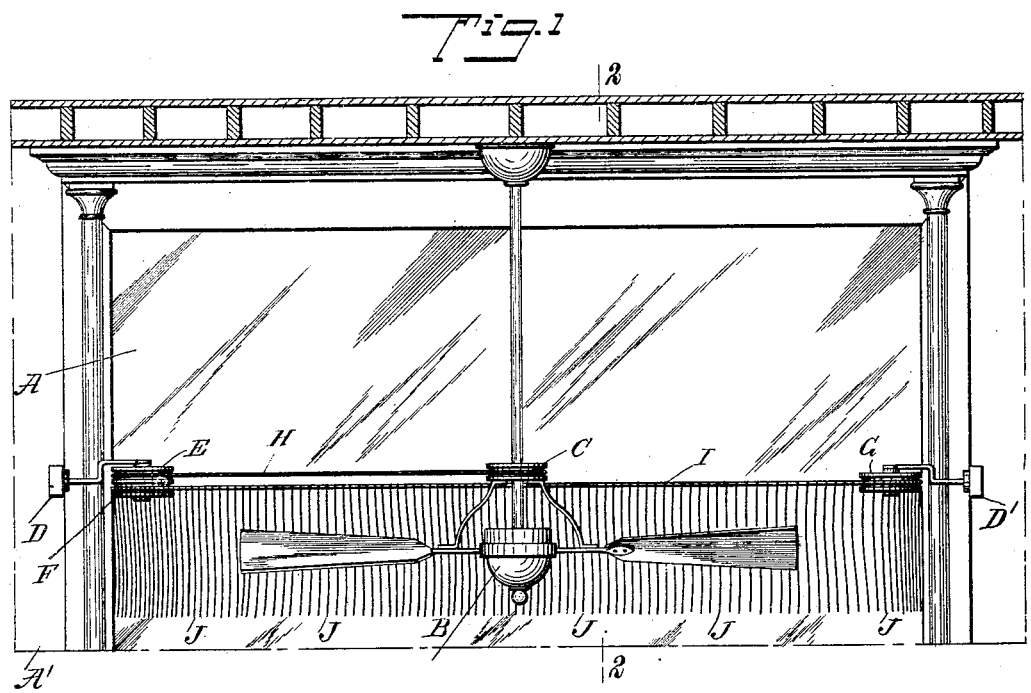
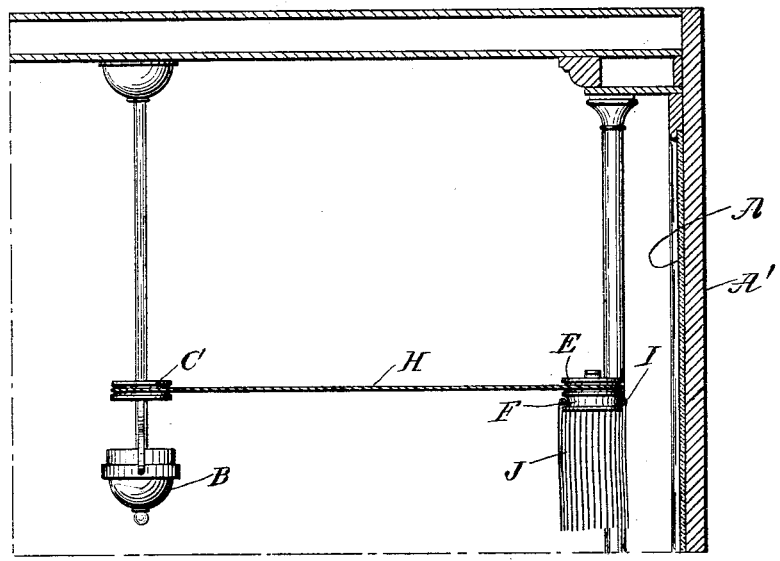
WITNESSES:
J. A. Brophy
Wm. P. Patton
INVENTOR
William C. McBride
BY
Munn
ATTORNEYS

UNITED STATES PATENT OFFICE.

WILLIAM C. McBRIDE, OF HILLSBORO, TEXAS.

VENTILATOR AND MIRROR-PROTECTOR.

SPECIFICATION forming part of Letters Patent No. 704,076, dated July 8, 1902.

Application filed September 28, 1901. Serial No. 76,890. (No model.)

*To all whom it may concern:*

Be it known that I, WILLIAM C. McBRIDE, a citizen of the United States, and a resident of Hillsboro, in the county of Hill and State of Texas, have invented new and useful Improvements in Ventilators and Mirror-Protectors, of which the following is a full, clear, and exact description.

The object of this invention is to so arrange pendent streamers and a rotatable fan near a mirror that the means for actuating the fan will serve to agitate the streamers for the chasing of flies from the mirror and also ventilate and cool a room by the current of wind produced by the fan.

The invention consists, essentially, in the novel construction and combination of parts, as is hereinafter described, and defined in the appended claims.

Reference is to be had to the accompanying drawings, forming a part of this specification, in which similar characters of reference indicate corresponding parts in both figures.

Figure 1 is a front elevation of the device arranged in position before an upright upper portion of a mirror, and Fig. 2 is a transverse sectional view substantially on the line 2 2 in Fig. 1.

The mirror A (shown broken away below the top portion) may be such as is provided as a wall decoration at a buffet or liquor-dispensing bar and have considerable dimensions. Ordinarily mirrors provided for the purpose mentioned in the summer-time are protected by a gauze covering, which obscures the mirror and detracts from its appearance as an ornament, such coverings being used to prevent flies from alighting on the mirror and fouling its surface.

The improvement comprises a pendent fan B, hung or otherwise supported at a suitable point in front of the mirror A, upright on the wall A', said fan having a pulley C affixed on its stem for rotation therewith. On a stationary support, that may be a bracket-arm D at one side of the mirror A, a pair of pulleys E F are rotatably mounted one above the other, and both of said pulleys are rigidly fixed upon the same hub, whereby the rotary movement of one pulley will drive the other one. At the opposite side edge of the mirror A a pulley G is rotatably supported in the same plane with the pulley F by a bracket-arm D'. Upon the pulleys C and E an endless belt H is mounted, and any available power may be employed to actuate the pulley E for rotation of the fan B.

Upon the lower pulley F and the opposite pulley G an endless cord I or other flexible connection is mounted and stretched taut. On the endless cord I a series of spaced streamers J are hung, and it will be seen that when the fan B is running the streamers will be moved across the mirror A and at the same time be agitated by the current of air produced by the fan, so that the continuous motion of the streamers will prevent flies from approaching the mirror, and at the same time the air-currents caused by the fan will cool and ventilate the room.

Having thus described my invention, I claim as new and desire to secure by Letters Patent—

1. A mirror-protecting and ventilating device, comprising a series of streamers arranged on an endless band, means to support and move longitudinally the band and streamers in front of a mirror, and a fan pendent in front of the streamers, air from the fan being adapted to agitate the streamers.

2. A mirror-protecting and ventilating device, comprising a pendent fan in front of a mirror, pulleys held to rotate at opposite side edges of the mirror, an endless flexible connection on the two opposite pulleys, streamers pendent from the endless connection, a pulley on the fan, a pulley affixed to and above one of the pulleys supporting the endless connection, and an endless belt connecting the uppermost pulley with the pulley on the fan.

In testimony whereof I have signed my name to this specification in the presence of two subscribing witnesses.

WILLIAM C. McBRIDE.

Witnesses:
JAMES A. McFADDEN,
LOU FENNELL.